(12) United States Patent
Lomax

(10) Patent No.: US 9,303,774 B2
(45) Date of Patent: Apr. 5, 2016

(54) VALVE ASSEMBLY

(75) Inventor: Stuart Lomax, West Yorkshire (GB)

(73) Assignee: Xamol Ltd., Brighouse, West Yorkshire (GB)

( * ) Notice: Subject to any disclaimer, the term of this patent is extended or adjusted under 35 U.S.C. 154(b) by 750 days.

(21) Appl. No.: 13/318,293

(22) PCT Filed: May 13, 2010

(86) PCT No.: PCT/GB2010/050777
§ 371 (c)(1),
(2), (4) Date: May 14, 2012

(87) PCT Pub. No.: WO2010/131039
PCT Pub. Date: Nov. 18, 2010

(65) Prior Publication Data
US 2012/0216894 A1 Aug. 30, 2012

(30) Foreign Application Priority Data
May 14, 2009 (GB) .................................. 0908259.5

(51) Int. Cl.
*E21B 33/06* (2006.01)
*F16K 5/20* (2006.01)
*F16K 5/06* (2006.01)
*F16K 27/06* (2006.01)

(52) U.S. Cl.
CPC .............. *F16K 5/201* (2013.01); *F16K 5/0642* (2013.01); *F16K 27/067* (2013.01); *Y10T 137/88046* (2015.04)

(58) Field of Classification Search
CPC ......... F16K 3/16; F16K 27/067; F16K 27/00; F16K 1/44; F16K 1/443; F16K 1/446; F16K 5/0668; F16K 24/02; F16K 15/042; F16K 15/044; F16K 15/048; F16K 15/046; F16K 1/305; F16K 1/307; F16K 5/0642; F16K 5/201; F17C 13/04; F16L 37/373; Y10T 137/87917; Y10T 137/87925; Y10T 137/87933; Y10T 137/88046; Y10T 137/88062; Y10T 137/87129; Y10T 137/6038; Y10T 137/6041; Y10T 137/6045
USPC .................. 137/315.19–315.21, 614, 614.01, 137/614.19, 614.21, 637.1, 613; 251/315.01, 314, 316, 174, 170
See application file for complete search history.

(56) References Cited

U.S. PATENT DOCUMENTS 1,535,576 A * 4/1925 Clark ........................ 137/614.14
1,898,569 A * 2/1933 Pearson ...................... 137/637.1
1,944,456 A * 1/1934 Pearson ......................... 137/271
(Continued)

FOREIGN PATENT DOCUMENTS

GB 2271164 A 4/1994
WO WO 9852400 A2 11/1998
(Continued)

*Primary Examiner* — Craig J Price
(74) *Attorney, Agent, or Firm* — Gable Gotwals

(57) ABSTRACT

The invention relates to a valve assembly that can be provided of a length to meet conventional fitting dimensions and requirements. The valve assembly includes a valve body housing, at least first and second valve balls. Between the first and second valve balls are provided first and second valve seats. The valve seats are biased towards their respective valve balls. The valve seats, that lie between the valve balls, are typically provided as part of a common valve seat assembly that includes springs and the like.

14 Claims, 4 Drawing Sheets

(56) References Cited

U.S. PATENT DOCUMENTS

| | | | | |
|---|---|---|---|---|
| 2,665,879 A * | 1/1954 | Housekeeper et al. | | 251/95 |
| 2,751,185 A * | 6/1956 | Shand | | 251/172 |
| 2,837,308 A * | 6/1958 | Shand | | 251/174 |
| 2,948,553 A * | 8/1960 | Gill | | F16L 37/107 |
| | | | | 137/614.02 |
| 2,973,182 A * | 2/1961 | Gill | | 251/174 |
| 3,013,769 A * | 12/1961 | Volpin | | 251/174 |
| 3,045,693 A * | 7/1962 | Allen | | 137/315.21 |
| 3,096,786 A * | 7/1963 | Rost | | 137/596.2 |
| 3,097,823 A * | 7/1963 | Kaiser | | 251/172 |
| 3,101,740 A * | 8/1963 | Ray | | 137/596 |
| 3,109,623 A * | 11/1963 | Bryant | | 251/172 |
| 3,114,386 A * | 12/1963 | Dumm | | 137/316 |
| 3,118,649 A * | 1/1964 | Allen et al. | | 251/309 |
| 3,118,650 A * | 1/1964 | Cooper et al. | | 251/172 |
| 3,123,078 A * | 3/1964 | Brooks | | 137/246.22 |
| 3,241,808 A * | 3/1966 | Allen | | 251/174 |
| 3,339,886 A * | 9/1967 | Grove | | 251/174 |
| 3,378,026 A * | 4/1968 | Oliver | | 137/246.22 |
| 3,379,410 A * | 4/1968 | Stewart, Jr. | | 251/359 |
| 3,382,892 A * | 5/1968 | Cerbin | | 137/614.02 |
| 3,384,337 A * | 5/1968 | Brown | | 251/172 |
| 3,387,815 A * | 6/1968 | Richards | | 251/174 |
| 3,392,743 A * | 7/1968 | Pennington | | 137/246.22 |
| 3,394,915 A * | 7/1968 | Gachot | | 251/174 |
| 3,401,915 A * | 9/1968 | Kim | | 251/174 |
| 3,406,943 A * | 10/1968 | Newell | | 251/163 |
| 3,414,233 A * | 12/1968 | Priese et al. | | 251/172 |
| 3,416,558 A * | 12/1968 | Works | | 137/246.22 |
| 3,518,742 A * | 7/1970 | Krosoczka et al. | | 29/890.125 |
| 3,533,597 A * | 10/1970 | Bolling | | 251/174 |
| RE26,998 E * | 12/1970 | Brown | | 251/172 |
| 3,554,485 A * | 1/1971 | Richards | | 251/172 |
| 3,565,392 A * | 2/1971 | Bryant et al. | | 251/159 |
| 3,645,294 A * | 2/1972 | Allread | | 137/614.03 |
| 3,667,727 A * | 6/1972 | Bowden | | 251/172 |
| 3,752,178 A * | 8/1973 | Grove et al. | | 137/246.22 |
| 3,760,833 A * | 9/1973 | Kemp et al. | | 137/246.22 |
| 3,921,656 A * | 11/1975 | Meisenheimer et al. | | 137/68.15 |
| 3,990,465 A * | 11/1976 | Allen | | 137/72 |
| 4,084,608 A * | 4/1978 | Laignel et al. | | 137/316 |
| 4,108,196 A * | 8/1978 | Calvert et al. | | 137/72 |
| 4,111,393 A * | 9/1978 | McClurg et al. | | 251/174 |
| 4,113,229 A * | 9/1978 | Fujiwara | | 251/174 |
| 4,137,936 A * | 2/1979 | Sekimoto et al. | | 137/246.22 |
| 4,232,697 A * | 11/1980 | Meisenheimer, Jr. | | 137/68.15 |
| 4,262,688 A * | 4/1981 | Bialkowski | | 137/242 |
| 4,266,566 A * | 5/1981 | Kacal et al. | | 137/316 |
| 4,276,905 A * | 7/1981 | Lourdeaux | | 137/613 |
| 4,286,614 A * | 9/1981 | Kacal et al. | | 137/72 |
| 4,292,989 A * | 10/1981 | Cazzaniga et al. | | 137/72 |
| 4,318,420 A * | 3/1982 | Calvert | | 137/74 |
| 4,335,747 A * | 6/1982 | Mitsumoto et al. | | 137/614.06 |
| 4,345,738 A * | 8/1982 | Ripert | | 251/315.01 |
| 4,364,544 A * | 12/1982 | Kim | | 251/328 |
| 4,428,561 A * | 1/1984 | Thompson | | 251/174 |
| 4,429,711 A * | 2/1984 | Schomer | | 137/385 |
| 4,477,055 A * | 10/1984 | Partridge | | 251/174 |
| 4,505,294 A * | 3/1985 | Walter | | 137/241 |
| 4,513,947 A * | 4/1985 | Amend | | 251/174 |
| 4,529,005 A * | 7/1985 | Sun | | 137/625.32 |
| 4,557,286 A * | 12/1985 | Nagano | | 137/74 |
| 4,566,489 A * | 1/1986 | Knapp et al. | | 137/614 |
| 4,572,239 A * | 2/1986 | Koch et al. | | 137/625.47 |
| 4,575,045 A * | 3/1986 | Martin et al. | | 251/172 |
| 4,651,775 A * | 3/1987 | Okada | | 137/625.41 |
| 4,658,847 A * | 4/1987 | McCrone | | 137/72 |
| 4,890,643 A * | 1/1990 | Oliver | | 137/614.11 |
| 4,911,408 A * | 3/1990 | Kemp | | 251/174 |
| 5,141,293 A * | 8/1992 | Gowda | | 303/84.2 |
| 5,186,202 A * | 2/1993 | Meisenheimer, Jr. | | 137/68.14 |
| 5,271,427 A * | 12/1993 | Berchem | | 137/375 |
| 5,332,001 A * | 7/1994 | Brown | | 137/614.06 |
| 5,338,003 A * | 8/1994 | Beson | | 251/172 |
| 5,402,825 A * | 4/1995 | McCracken | | 137/614.06 |
| 5,419,532 A * | 5/1995 | Fan | | 251/315.08 |
| 5,488,972 A * | 2/1996 | McCracken et al. | | 137/614.06 |
| 5,624,101 A * | 4/1997 | Beson | | 251/172 |
| 5,642,754 A * | 7/1997 | Rabby | | 137/613 |
| 5,685,338 A * | 11/1997 | Trunk | | 137/613 |
| 5,806,563 A * | 9/1998 | Rabby | | 137/613 |
| 6,073,648 A * | 6/2000 | Watson et al. | | 137/375 |
| 6,182,696 B1 * | 2/2001 | Rainwater et al. | | 137/614.21 |
| 6,220,290 B1 * | 4/2001 | Lomax | | 137/613 |
| 6,230,738 B1 * | 5/2001 | Watanabe et al. | | 137/486 |
| 6,425,571 B1 * | 7/2002 | Schadewald et al. | | 251/315.13 |
| 6,499,720 B1 * | 12/2002 | Lee | | 251/174 |
| 6,668,933 B2 * | 12/2003 | Kent | | 166/334.2 |
| 6,681,802 B2 * | 1/2004 | McHugh | | 137/613 |
| 6,698,715 B2 * | 3/2004 | Smith et al. | | 251/174 |
| 6,830,069 B2 * | 12/2004 | Shillito et al. | | 137/613 |
| 7,121,295 B2 * | 10/2006 | Seneviratne et al. | | 137/375 |
| 7,275,564 B2 * | 10/2007 | Bazin et al. | | 137/625.47 |
| 7,287,544 B2 * | 10/2007 | Seneviratne et al. | | 137/375 |
| 7,350,765 B2 * | 4/2008 | Leblanc et al. | | 251/315.01 |
| 7,559,531 B2 * | 7/2009 | Thomas et al. | | 251/185 |
| 7,699,074 B2 * | 4/2010 | Lomax | | 137/614.01 |
| 8,082,947 B2 * | 12/2011 | Chang et al. | | 137/614.01 |
| 8,201,574 B2 * | 6/2012 | Beasley | | 137/15.22 |
| 8,453,676 B2 * | 6/2013 | Smith et al. | | 137/613 |
| 8,490,945 B2 * | 7/2013 | Keeper et al. | | 251/172 |
| 8,601,634 B1 * | 12/2013 | Stunkard | | 15/104.062 |
| 2003/0084942 A1 * | 5/2003 | McHugh | | 137/613 |
| 2010/0090146 A1 * | 4/2010 | Keeper et al. | | 251/172 |
| 2011/0260088 A1 * | 10/2011 | Cunningham | | 251/315.01 |
| 2013/0068982 A1 * | 3/2013 | Alink et al. | | 251/315.1 |
| 2014/0001388 A1 * | 1/2014 | Lomax | | 251/181 |
| 2014/0054483 A1 * | 2/2014 | Avdjian | | 251/315.16 |

FOREIGN PATENT DOCUMENTS

| | | |
|---|---|---|
| WO | WO 0229303 A1 | 4/2002 |
| WO | WO 2004097275 A1 | 11/2004 |
| WO | WO 2006024860 A1 | 3/2006 |

* cited by examiner

VALVE ASSEMBLY

CROSS-REFERENCE TO RELATED APPLICATIONS

This application is the United States National Phase of PCT Patent Application No. GB2010/050777 filed on 13 May 2010, which claims priority to British Patent Application No. 0908259.5 filed 14 May 2009, both of which are incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

SEQUENCE LISTING

Not Applicable

BACKGROUND OF THE INVENTION

The invention to which this application relates is to a valve assembly. Particularly, although not necessarily exclusively the invention relates to an improvement to the type of valve known as a double block and bleed valve in which typically three independent valve units are provided within a valve body.

The provision of double block and bleed valves is well known in the industry and the applicant has several granted patents in this field. One common problem, which is experienced with this form of valve, is the requirement to fit the valve assembly into the space, which is available between adjacent pipe flanges. For larger diameter pipelines in particular the length of the conventional double block and bleed valve assembly can be greater than the ANSI B16.10 specified space. This means that if, for example, the conventional double block and bleed valve is being used to replace a single valve in an existing pipeline, the space available is too small. This therefore means that additional works are required to be performed on the pipeline, which can lead to additional time and expense being incurred.

A further problem is that the conventional double block and bleed valve assembly includes a significant number of components, which add to the complexity of the assembly process and the time for assembly.

BRIEF SUMMARY OF THE INVENTION

The aim of the present invention is therefore to provide a valve assembly which can more readily be provided of a length to meet conventional fitting requirements. A further aim is to provide a valve assembly, which can be more easily assembled whilst at the same time providing the required operating performance.

In a first aspect of the invention there is provided a valve assembly, said valve assembly including a valve body housing, first and second valve balls and between said first and second valve balls are provided first and second valve seats wherein said valve seats are biased towards their respective valve balls by common biasing means.

Typically said biasing means are springs and more typically coil springs. Typically said biasing means are positioned to lie between said first and second seats with a first end of said biasing means acting on the first seat and the opposing end of said biasing means acting on the second seat. In one embodiment, when the fluid flows through the valve in a first direction, the biasing means acts on one of the first or second seats to move the same towards the first or second valve ball respectively, and when the fluid flows through the valve in the opposing direction the same biasing means act on the other of the first or second seats to move the seat towards the other of the first or second valve balls.

In one embodiment the first and second seats and the biasing means are provided as a seat assembly which is located within the valve assembly.

The valve seats are typically provided to seal against the valve ball and typically the strength of the biasing means, and/or the number of the same which are provided are selected with respect to the fluid passing through the valve, the size of the valve passage along which the fluid flows and/or the pressure of the fluid. When a number of biasing means are provided the same are typically spaced around the circumference of the passage of the valve.

Typically the fluid acts in conjunction with the biasing means to exert the movement force on said first or second seat depending on the direction of flow of the fluid.

In one embodiment the valve body is formed from two parts, the interface of which is located at, or close to, the location of the seats and biasing means. Alternatively, the valve body is formed of one part and the seats and biasing means are introduced into position from an end of the valve body.

Typically the valve assembly includes a passage from a first end to a second end and the first and second valve units are provided spaced along the passage, each valve unit provided to allow the selective closing and opening of the passage.

In one embodiment there is provided a vent located intermediate the first and second valve units. In one embodiment the vent passage is formed around the circumference of the seat assemblies.

By providing biasing means which act on both seats so the overall length of the valve assembly can be significantly reduced and, importantly, can be reduced sufficiently so that the same is at or less than the required ANSI B16:10 length for the particular pipe diameter. Also, as the length of the valve body can be reduced so material savings can be made which can lead to significant savings in weight and material costs incurred.

In a further aspect of the invention there is provided a double block and bleed valve assembly, said assembly including a first ball valve unit and a second ball valve unit spaced apart in a fluid passage through the valve assembly and wherein intermediate said first and second valve balls there is provided a seat assembly including a first seat and a second seat and biasing means to exert a biasing force on the first and second seats in opposing directions.

Typically the same biasing means exerts the biasing force on both the first and second seats and is retained in position between the same.

Typically the biasing force is used to move each seat to seal on the valve ball of the respective first or second valve unit.

In one embodiment the biasing means are spaced around the circumference of the seats so as to exert a constant movement force around the seat.

BRIEF DESCRIPTION OF THE SEVERAL VIEWS OF THE DRAWINGS

Specific embodiments of the invention will now be described; wherein.

DETAILED DESCRIPTION OF THE INVENTION

Figure 1:
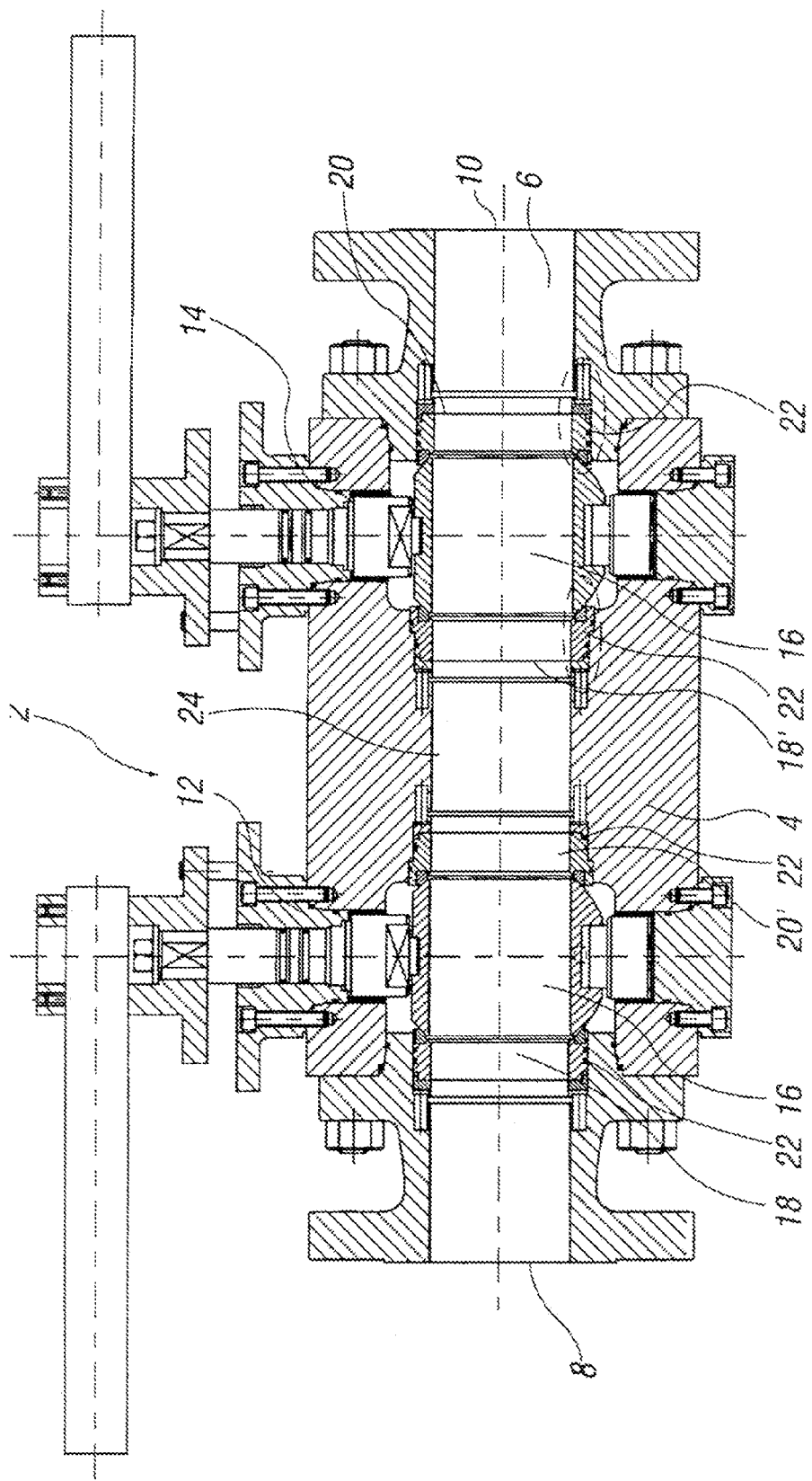
FIG. 1 illustrates a conventional double block and bleed valve arrangement in section along the longitudinal centre axis.

Referring first to FIG. 1, there is illustrated a conventional form of a double block and bleed valve assembly 2. The assembly comprises a body 4, which has a passage running between ends 8, 10. The housing contains two ball valve units 12, 14 each of which include a valve ball 16 with respective seats 18, 20, 18', 20' on either side. The seats 18, 20 are biased onto the respective ball 16 by biasing means 22, typically in the form of springs, which are mounted on the valve body at one end and the other end acts on the seat to force the same towards the ball. Typically the springs are provided in sufficient number and of a size to suit the size of valve assembly to ensure that sufficient force is applied to the seat onto the ball so as to allow a seal to be created.

The seats 18'20' lie intermediate the valve balls 16 and conventionally, as shown, in order to allow the seats and springs to operate correctly a land portion 24 is provided in the valve body. The provision of the land portion causes the length of the valve assembly, at least for certain sizes, to be greater than the ANSI B16:10 standard length which causes problems in terms of expense and time of installation.

Figure 2:
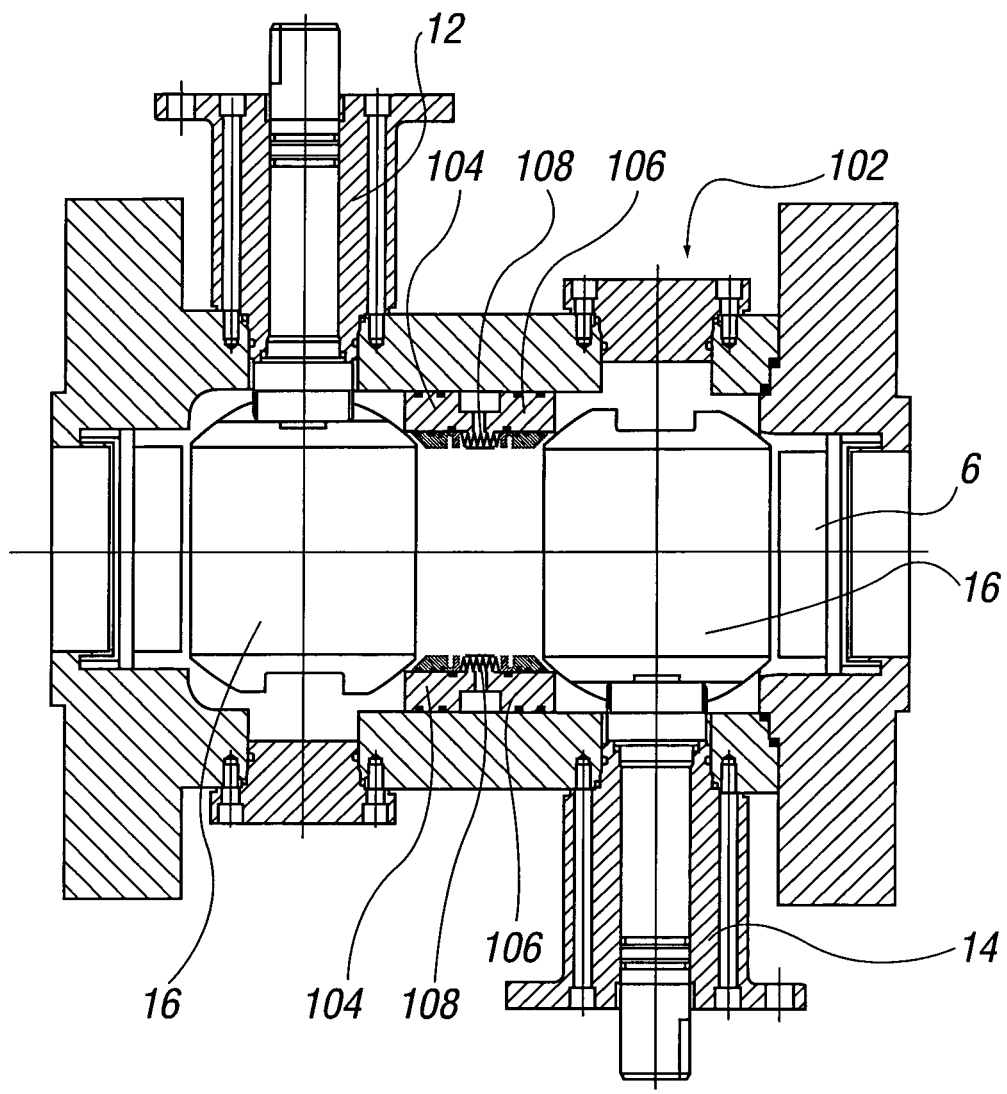
FIGS. 2-3 illustrate a valve assembly in accordance with two embodiments of the invention in section along the longitudinal centre axis.
Figure 3:
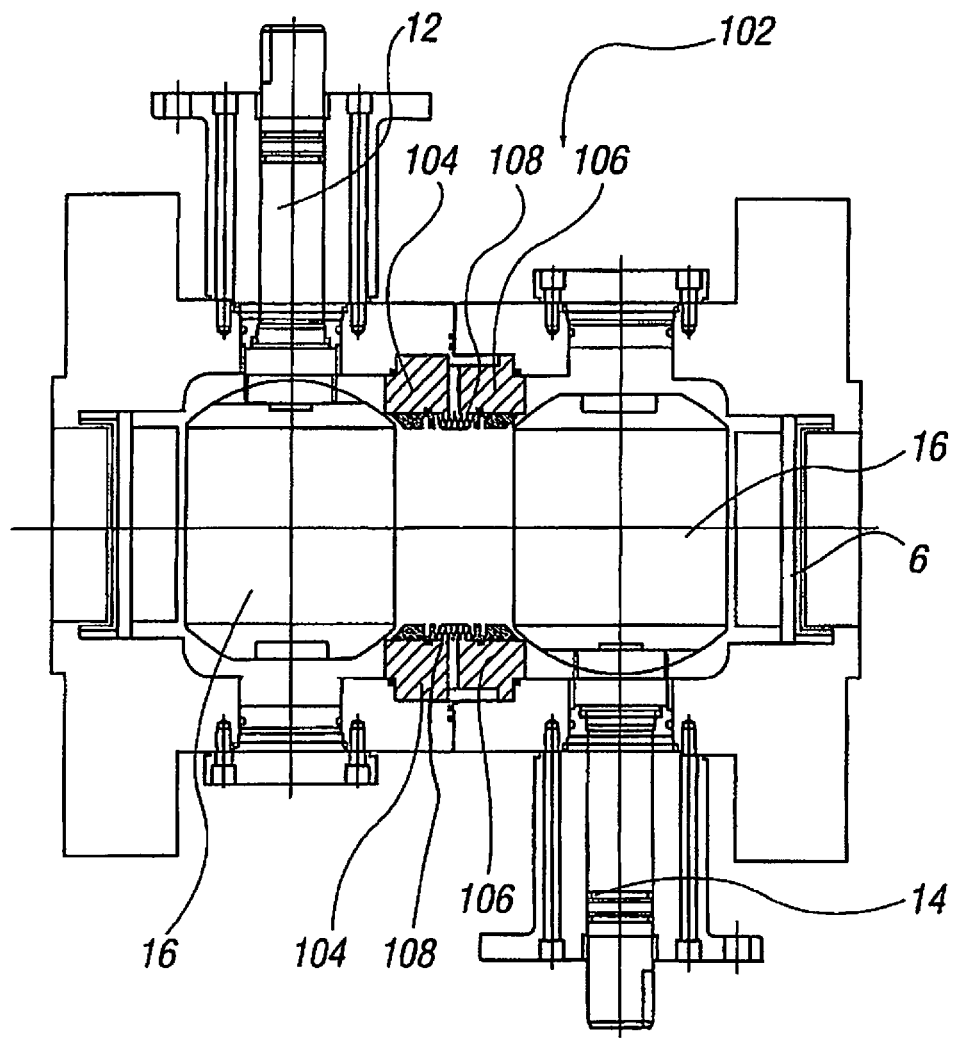
Figure 4:
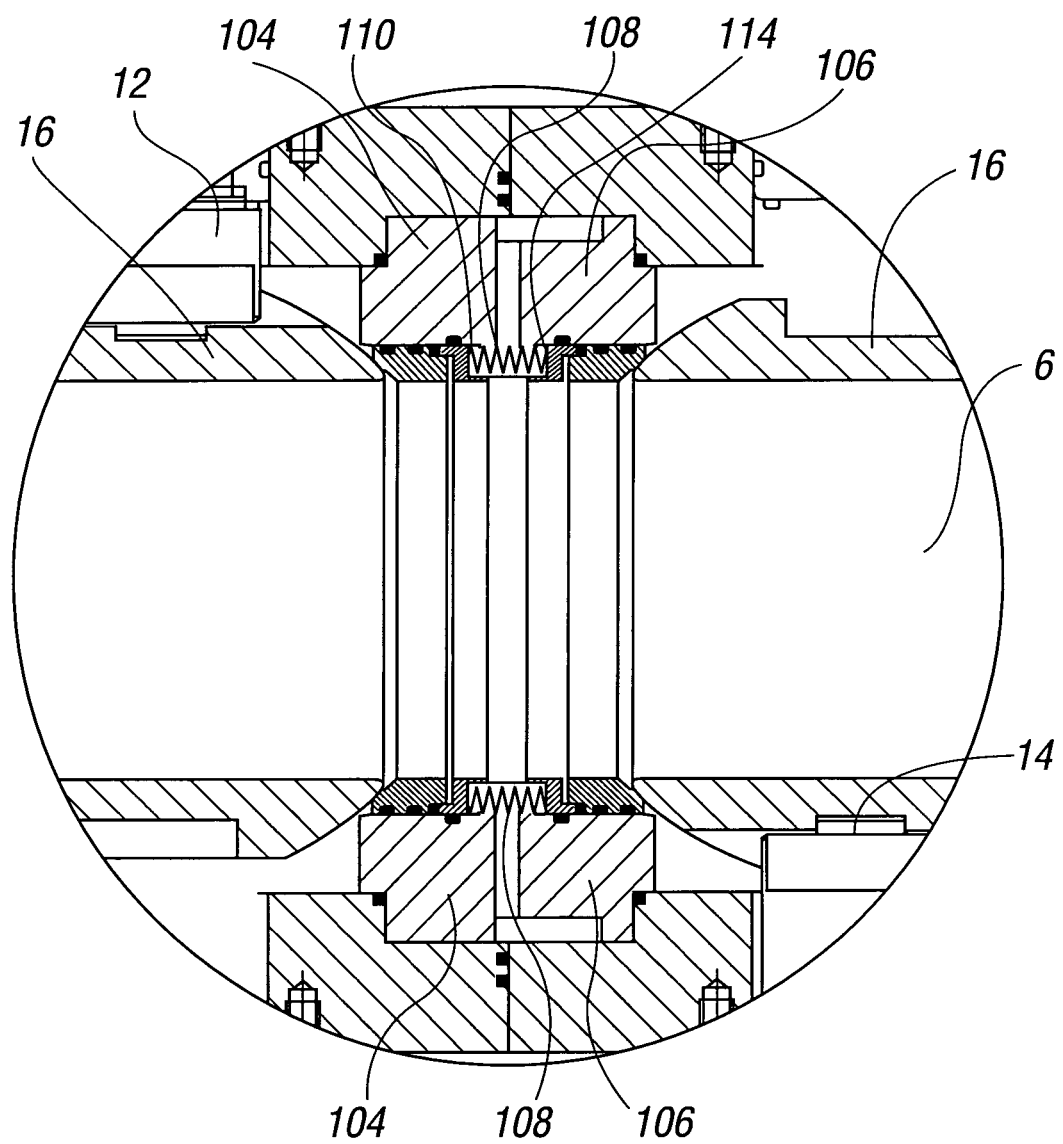
FIG. 4 illustrates a detailed view of the seat arrangement in accordance with the invention.

FIGS. 2-4 illustrate two embodiments of a valve assembly 102 in accordance with the invention. The parts of the valve assembly that are common with those of FIG. 1 are provided with the same reference numbers as FIG. 1 and are not described again. The main feature of the valve assembly 102 in accordance with the invention is that the central seats 18' 20' and land 24 of FIG. 1 have been withdrawn and replaced by a valve seat assembly in another manner so as to provide significant benefits in terms of reducing the length of the valve assembly.

In accordance with the invention, the seats 104, 106 are no longer separated by a land and are positioned adjacent to each other as shown in detail in FIG. 4. In addition, the seats are now acted upon by biasing means in the form of springs 108 which are common to both seats inasmuch that the ends 110 of the springs are positioned act on the seat 104 to apply force to move the seat towards the ball 16 of valve unit 12 and the ends 114 of the springs act on the seat 106 to move the same towards the ball 16 of valve unit 14.

It will be appreciated that the springs can be spaced around the seats so as to allow a uniform force to be exerted thereon. Also the pressure of the fluid acts in conjunction with the springs to move the seat towards the ball and typically, dependent on the direction of fluid through the passage 6 of the valve assembly, at any given time the springs will be exerting a greater force in one direction on one seat than on the other seat. Typically the biasing means will be exerting a greater force on the valve seat 104 or 106 which is positioned downstream with respect to the direction of flow of fluid along the valve passage.

The valve body can be formed of two parts joined together at an interface which is located intermediate the valves 12,14 as shown in FIG. 3, or alternatively can be a single part in which the components are introduced from one end and a bolt on end flange is provided to complete the assembly as shown in FIG. 2. Alternatively a single threaded insert can be used.

The present invention therefore allows the characteristics of operation of the valve assembly of this type to be maintained and also allows the length of the valve assembly to be reduced, which has considerable benefit.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A valve assembly, said valve assembly including a valve body, first and second valve balls, the valve assembly includes a passage which passes from a first end to a second end of the valve body and through said valve balls, said valve balls provided spaced along the passage and between said first and second valve balls are provided first and second valve seats, the valve body is formed from two parts and an interface between which is located at or adjacent to a location of the first and second valve seats, with one of said valve seat located in each of said valve body parts, and a plurality of biasing means therefore, said biasing means are common and are capable of biasing said first and second valve seats towards their respective valve balls to seal against the respective valve ball, wherein said plurality of biasing means are located between and abutting said valve seats.

2. The valve assembly according to claim 1 wherein the biasing means for biasing the valve seats is a spring.

3. The valve assembly according to claim 2 wherein the spring is a coil spring, wave spring and/or disc spring.

4. The valve assembly according to claim 1 wherein the biasing means for biasing the valve seats are positioned to lie between the said first and second seats, with a first end of the biasing means for biasing the valve seats acting on the first valve seat and the opposing end of the said biasing means for biasing the valve seats acting on the second valve seat.

5. The valve assembly according to claim 1 wherein when the fluid flows through the valve assembly in a first direction, the biasing means for biasing the valve seats acts on one of the first or second valve seats to move said first or second valve seats towards the first or second valve ball respectively and, when the fluid flows through the valve assembly in an opposing direction, the same biasing means for biasing the valve seats acts on the other of the first or second valve seats to move that valve seat towards the other of the first or second valve balls.

6. The valve assembly according to claim 1 wherein the first and second valve seats and the biasing means for biasing the valve seats are provided as a seat assembly located within the valve assembly.

7. The valve assembly according to claim 1 wherein the plurality of biasing means for biasing the valve seats are provided, each capable of acting on the first and second valve seats.

8. The valve assembly according to claim 1 wherein the fluid acts in conjunction with the biasing means for biasing the valve seats to exert a movement force on said first or second valve seat depending on a direction of flow of the fluid.

9. The valve assembly according to claim 1 wherein said valves balls are spaced along the passage and each of said valve balls is provided to allow selective closing and opening of the passage.

10. A double block and bleed valve assembly, said assembly including a first ball valve unit and a second ball valve unit and a passage through which fluid can flow which passes from a first end to a second end of the valve body and through the valve balls, the valve balls being provided spaced apart in fixed positions in the fluid passage and wherein, intermediate said first and second ball valves there is provided a seat assembly including a first valve seat and a second valve seat, said valve body is formed from two parts and an interface between which is located at or adjacent to a location of the first and second valve seats with one of said valve seats located in each of said valve body parts and a plurality of biasing means, said biasing means are common and capable of exerting a biasing force on the first and second valve seats in opposing directions to move the valve seats to seal against the respective valve ball, wherein said plurality of biasing means are located between and abutting said valve seats.

11. The valve assembly according to claim 10 wherein the biasing means for exerting a biasing force on both the first and second valve seats are retained in position between the first and second valve seats.

12. The valve assembly according to claim 11 wherein the biasing force is used to move the valve seats to seal on a surface of a ball of the respective first and second ball valves units.

13. The valve assembly according to claim 10 wherein the biasing means for exerting a biasing force are spaced around a circumference of the valve seats so as to exert a uniform movement force around each of the valve seats.

14. The valve assembly according to claim 10 wherein, the biasing means exerts the biasing force to move one of the valve seats onto an adjacent wall, with said one of the valve seats which lies downstream of the biasing means for exerting a biasing force with respect to the flow of fluid through the valve assembly.

* * * * *